US012726060B2

(12) United States Patent
Backhouse

(10) Patent No.: US 12,726,060 B2
(45) Date of Patent: Sep. 1, 2026

(54) ROTOR ASSEMBLY

(71) Applicant: ROLLS-ROYCE plc, London (GB)

(72) Inventor: Robert C. Backhouse, Wells (GB)

(73) Assignee: Rolls-Royce plc, London (GB)

( * ) Notice: Subject to any disclaimer, the term of this patent is extended or adjusted under 35 U.S.C. 154(b) by 183 days.

(21) Appl. No.: 18/807,218

(22) Filed: Aug. 16, 2024

(65) Prior Publication Data

US 2025/0105685 A1 Mar. 27, 2025

(30) Foreign Application Priority Data

Sep. 27, 2023 (GB) ..................................... 2314789

(51) Int. Cl.

| | |
|---|---|
| ***H02K 1/04*** | (2006.01) |
| ***B29C 70/32*** | (2006.01) |
| ***H02K 1/2706*** | (2022.01) |
| ***H02K 15/03*** | (2006.01) |
| ***H02K 15/12*** | (2006.01) |
| *B29K 105/10* | (2006.01) |
| *B29K 307/04* | (2006.01) |
| *B29K 309/08* | (2006.01) |
| *B29L 31/00* | (2006.01) |

(52) U.S. Cl.

CPC ........... *H02K 1/2706* (2013.01); *B29C 70/32* (2013.01); *H02K 15/03* (2013.01); *H02K 15/12* (2013.01); *B29K 2105/101* (2013.01); *B29K 2307/04* (2013.01); *B29K 2309/08* (2013.01); *B29L 2031/749* (2013.01); *H02K 2213/03* (2013.01); *H02K 2215/00* (2021.08)

(58) Field of Classification Search

CPC ...... H02K 1/278; H02K 15/03; H02K 15/035; H02K 1/04; H02K 1/02; H02K 15/12; H02K 15/128

See application file for complete search history.

(56) References Cited

U.S. PATENT DOCUMENTS

| | | | |
|---|---|---|---|
| 2,974,242 | A | 3/1961 | Apstein |
| 10,307,973 | B2 | 6/2019 | Lander et al. |
| 11,863,026 | B2 | 1/2024 | Høyland et al. |
| 11,909,293 | B2 | 2/2024 | Høyland |

(Continued)

FOREIGN PATENT DOCUMENTS

| | | | |
|---|---|---|---|
| DE | 102022112346 | A1 | 3/2023 |
| EP | 2560270 | A1 | 2/2013 |

(Continued)

OTHER PUBLICATIONS

Great Britain search report dated Mar. 27, 2024, issued in GB Patent Application No. 2314789.5.

(Continued)

*Primary Examiner* — Masoud Vaziri

(57) ABSTRACT

The disclosure relates to a stator assembly for an electric machine. Example embodiments disclosed include a rotor assembly for an electric machine, the rotor assembly comprising: a rotor core; a plurality of magnets arranged around the rotor core; and a cylindrical rotor sleeve surrounding the plurality of magnets, wherein the rotor sleeve comprises a laminated composite material having an array of ferromagnetic pins extending through a thickness of the rotor sleeve.

20 Claims, 4 Drawing Sheets

(56) References Cited

U.S. PATENT DOCUMENTS

| | | | | |
|---|---|---|---|---|
| 2003/0193260 | A1* | 10/2003 | Reiter, Jr. | H02K 1/02 310/216.064 |
| 2013/0043756 | A1* | 2/2013 | Bradley | H02K 5/128 310/156.28 |
| 2017/0373548 | A1* | 12/2017 | Arimatsu | H02K 1/2781 |
| 2019/0199151 | A1* | 6/2019 | Loder | H02K 1/02 |
| 2022/0209598 | A1 | 6/2022 | Boxberg et al. | |
| 2022/0271601 | A1 | 8/2022 | Høyland | |
| 2022/0302779 | A1 | 9/2022 | Chong et al. | |
| 2023/0070394 | A1* | 3/2023 | Fatemi | H02K 5/128 |
| 2023/0078127 | A1 | 3/2023 | Thaxton et al. | |
| 2023/0402890 | A1* | 12/2023 | Ono | H02K 1/28 |

FOREIGN PATENT DOCUMENTS

| | | | |
|---|---|---|---|
| EP | 4050768 | A1 | 8/2022 |
| EP | 4050769 | A1 | 8/2022 |
| EP | 4050770 | A1 | 8/2022 |
| JP | H06284610 | A | 10/1994 |

OTHER PUBLICATIONS

European search report dated Feb. 10, 2025, issued in EP Patent Application No. 24199394.8.

* cited by examiner

ROTOR ASSEMBLY

CROSS-REFERENCE TO RELATED APPLICATIONS

This specification is based upon and claims the benefit of priority from UK Patent Application Number 2314789.5 filed on Sep. 27 2023, the entire contents of which are incorporated herein by reference.

BACKGROUND

Technical Field

The disclosure relates to a rotor assembly for an electric machine.

Description of the Related Art

Electric machines convert electrical energy to mechanical energy or vice versa. An electric machine may operate as a generator that converts mechanical energy into electrical energy or a motor that converts electrical energy into mechanical energy. An example electric machine includes a rotor that rotates within a stator. Energy flows through the stator to or from the rotor. In an electric motor, the stator provides a rotating magnetic field that drives the rotor. In a generator, the stator converts the rotating magnetic field to electric energy.

The rotor of a typical electric machine comprises permanent magnets to provide magnetic fields that interact with magnetic fields generated or induced in the stator. For high-speed electric machines, these magnets need to be retained with a high tensile strength outer sleeve. Such an outer sleeve may be pre-tensioned to provide radial compression that prevents movement and instability of the magnets. Composite materials may be used for this purpose due to their high specific strength and stiffness and relatively low losses and electromagnetic transparency. Carbon fibre composites may be used due to their favourable strength and stiffness properties and commercial availability. Although electrically conductive, carbon fibre composite components can be designed to provide relatively thin banding with low losses.

Carbon fibre rotor sleeves are typically pre-manufactured to an engineered lay-up, thickness and internal diameter and then press fitted and forced over the rotor under pre-stress which is largely retained in situ. This pre-stress is set to prevent magnet lift-off and instability under rotor operating speeds and temperatures. Composite materials may alternatively be directly wound and heat-set or cured in-situ on the rotor. This latter process has some limitations due to the balance between heat required for curing and the thermal capability of the magnets and other rotor ancillaries. Obtaining a well-defined and controlled pre-stress is also challenging by this route but may be suited to lower power machines requiring only thin bands.

Metallic banding may in some cases be used due to convenient thermal capability and cost but tends to have higher density and exhibit higher losses compared with CFRP (carbon fibre reinforced polymer).

High speed and high-power electric machines may be used in aerospace applications, where weight and power efficiency are of primary importance. FIG. 1 illustrates an aircraft 100 comprising a propulsion system 102. The propulsion system may include an electric machine 104 acting as a motor for driving a propulsor 130. A further electric machine 108 may operate as a motor for starting the propulsor 130 when driven by a gas turbine engine and as a generator for generating electrical power when the gas turbine engine is operational. An electrical energy storage unit 110 may be coupled to the electric machines 104, 108 via an electrical bus 114. Each of the electric machines 104, 108 may be required to operate at high power and high speeds.

FIG. 2 is a schematic sectional drawing of an example electric machine 200. The electric machine 200 includes a stator assembly 202 and a rotor assembly 204. The stator assembly 202 includes an outer sleeve 206 and a plurality of stator teeth 208 projecting radially inwards towards a longitudinal axis A of the rotor assembly 204. The plurality of stator teeth 208 are disposed circumferentially around the longitudinal axis A. A plurality of slots 210 are defined between the stator teeth 208. A plurality of stator windings (not shown) are wound around the plurality of stator teeth 208 and at least partially fill the stator slots 210. The rotor assembly 204 includes a rotor core 212, a plurality of magnet pairs 214*a* and 214*b* of opposite polarity (collectively referred to as magnets 214) on or about the surface of rotor core 212, a metallic layer 216, and metallic banding 218. The metallic banding 218 may be configured to secure the magnets 214 to the rotor core 212. The rotor core 212 may include or be coupled to a drive shaft. When the electric machine 200 is operating as a generator, a torque may be applied to the rotor assembly 204 via the rotor core 212, causing an alternating magnetic field at each of stator teeth 208 due to the rotation of the magnet pairs 214*a*, 214*b*. The alternating magnetic fields induce an AC current to flow in the stator windings, thereby converting the mechanical energy (rotation) of the rotor into electrical energy in the windings. When the electric machine 200 is operating as a motor, the opposite conversion occurs, i.e. AC current flowing through the stator windings causing alternating magnetic fields, which interact with the magnets 214 to induce a torque on the rotor assembly 204, thereby converting electrical energy in the windings to mechanical energy of the rotor assembly. Further details of the electric machine 200 are provided in US 2022/302779 A1.

The metallic banding 218 in the electric machine 200 of FIG. 2 may be replaced by a composite rotor sleeve, as for example disclosed in EP4050768A1, EP4050769A1 and EP4050770A1. Advantages of a composite rotor sleeve include a reduced overall weight of the electric machine and a reduced effect on the magnetic fields generated and induced by the rotor and stator, leading to more efficient operation.

SUMMARY

According to a first aspect there is provided a rotor assembly for an electric machine, the rotor assembly comprising:

- a rotor core;
- a plurality of magnets arranged around the rotor core; and
- a cylindrical rotor sleeve surrounding the plurality of magnets,
- wherein the rotor sleeve comprises a laminated composite material having an array of ferromagnetic pins extending through a thickness of the rotor sleeve.

The use of ferromagnetic pins in the rotor sleeve has the effect of improving efficiency of the electric machine by reducing the effective gap between the rotor and stator coils in an electric machine comprising the rotor assembly.

The array of ferromagnetic pins optionally extends around the rotor sleeve with a circumferential areal density of between around 0.5% and 2%. Lower areal densities will tend to have declining effectiveness, while higher areal densities, i.e. above around 2%, may cause adverse disruption to the composite material leading to possible weakening of the material, but can be useful in certain electric machines depending on their performance and duty requirements.

The ferromagnetic pins may be composed of a ferrous material. The ferrous material may be selected from iron and cobalt or an alloy thereof. In a more general aspect, the ferromagnetic pins may be composed of a soft magnetic material, which may be defined as a material having a magnetic coercivity of less than around 1000 A/m. Such materials have the effect of channeling the magnetic flux through the rotor sleeve. The material may be an alloy such as an iron-silicon, nickel-iron or iron-cobalt alloy. In some applications a corrosion resistant alloy may be used such as a ferritic stainless steel alloy.

The ferromagnetic pins may have a diameter of between around 0.25 mm and around 0.5 mm. Pins within this range can be inserted with suitable automated processes and with a small impact on the composite material performance. An upper limit on the pin diameter may be determined by the disruption to the composite material performance. Larger pin diameters, which may result in a reduction in composite strength, may be acceptable in some applications depending on the duty and function of the electric machine.

The ferromagnetic pins may be aligned radially through the thickness of the rotor sleeve.

The ferromagnetic pins may be uniformly distributed around the rotor sleeve.

The rotor sleeve may comprise a first inner layer and a second outer layer, the ferromagnetic pins extending through a thickness of the first inner layer.

The laminated composite material may comprise a first plurality of layers of a first composite material interleaved with a second plurality of layers of a second composite material.

The first composite material may be a GFRP (glass fibre reinforced polymer) and the second material a CFRP (carbon fibre reinforced polymer).

The first composite material may comprise fibres aligned at between around 30° and 60° to a longitudinal axis of the rotor sleeve.

The second composite material may comprise fibres aligned at around 90° to a longitudinal axis of the rotor sleeve.

According to a second aspect there is provided an electric machine comprising:

- a stator assembly; and
- a rotor assembly according to the first aspect within the stator assembly.

According to a third aspect there is provided a method of manufacturing a rotor sleeve for an electric machine, the method comprising:

- winding a resin-impregnated fibrous material around a cylindrical mandrel to form a laminated composite material rotor sleeve; and
- inserting a plurality of ferromagnetic pins through a thickness of the rotor sleeve to provide an array of ferromagnetic pins around the rotor sleeve.

The array of ferromagnetic pins may extend around the rotor sleeve with the pins covering a circumferential areal density of between around 0.5% and 2%.

The ferromagnetic pins may be composed of a ferrous material. The ferrous material may be selected from iron and cobalt, alloys thereof, or material such as those described above in relation to the first aspect.

The ferromagnetic pins may have a diameter of between around 0.25 mm and around 0.5 mm.

The ferromagnetic pins may be aligned radially through the thickness of the rotor sleeve.

The ferromagnetic pins may be uniformly distributed around the rotor sleeve.

The method may comprise winding a further resin-impregnated fibrous material around the rotor sleeve following insertion of the plurality of ferromagnetic pins.

According to a fourth aspect there is provided a method of manufacturing a rotor assembly for an electric machine, comprising:

- manufacturing a rotor sleeve according to the method of the third aspect; and
- fitting the rotor sleeve around a plurality of magnets arranged around a rotor core.

The step of fitting the rotor sleeve may comprise press-fitting the rotor sleeve around the plurality of magnets such that a circumferential tension is applied to the rotor sleeve.

According to a fifth aspect there is provided a method of manufacturing an electric machine, comprising:

- manufacturing a rotor assembly according to the fourth aspect; and
- inserting the rotor assembly within a stator assembly.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Figure 1:
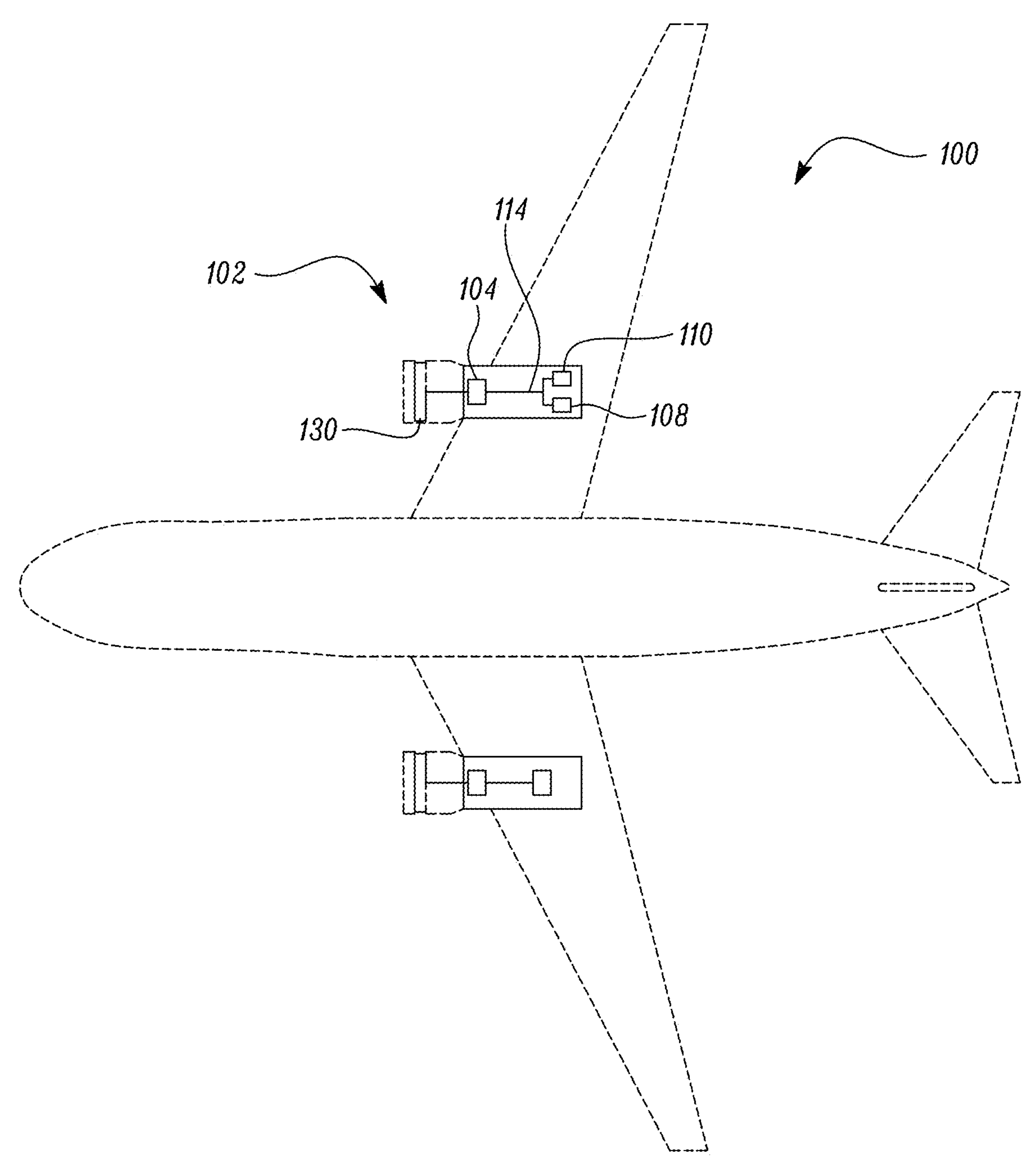
FIG. 1 is a schematic diagram of an aircraft comprising an electric machine.
Figure 2:
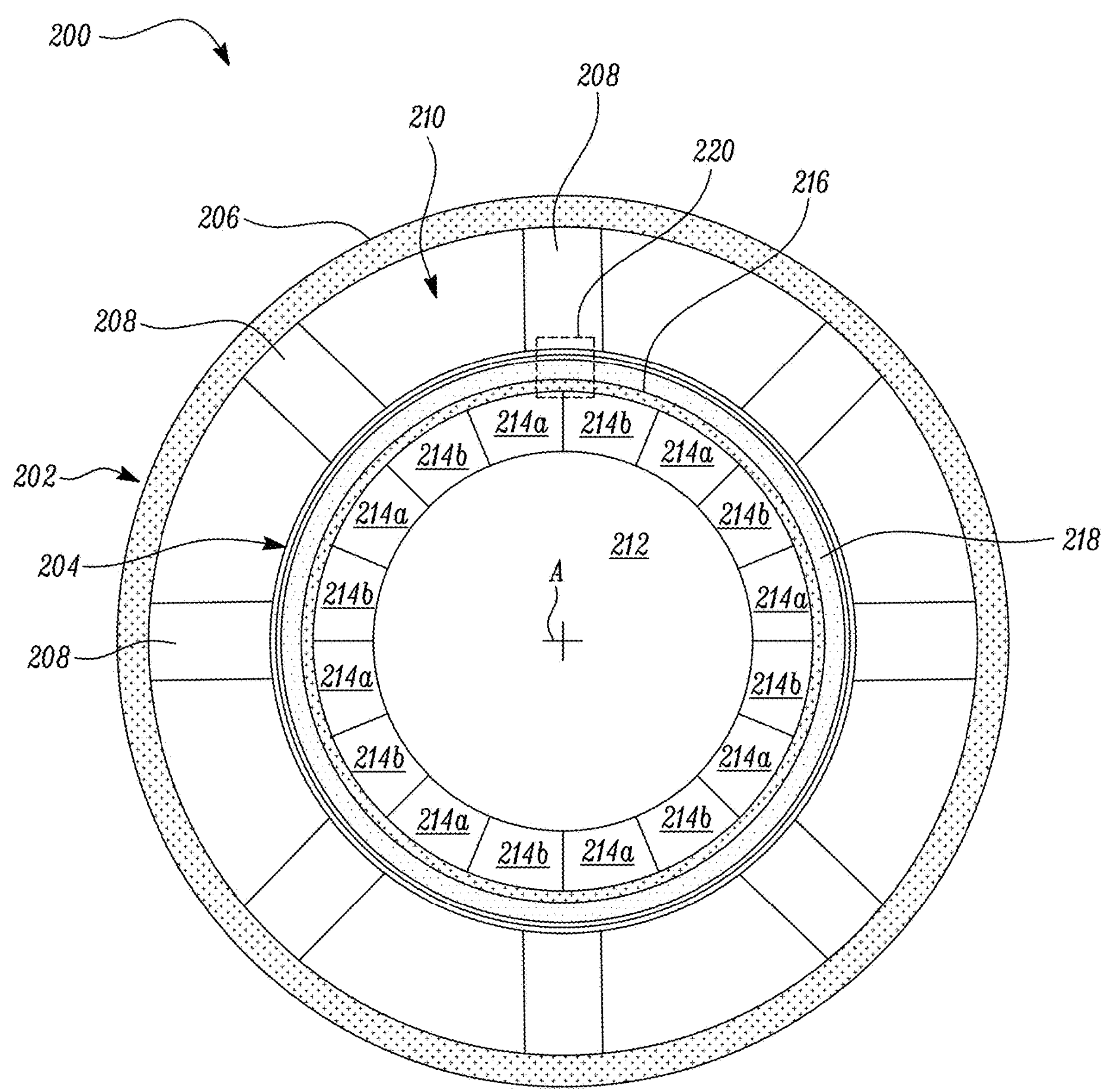
FIG. 2 is a schematic sectional diagram of an example electric machine.
Figure 3:
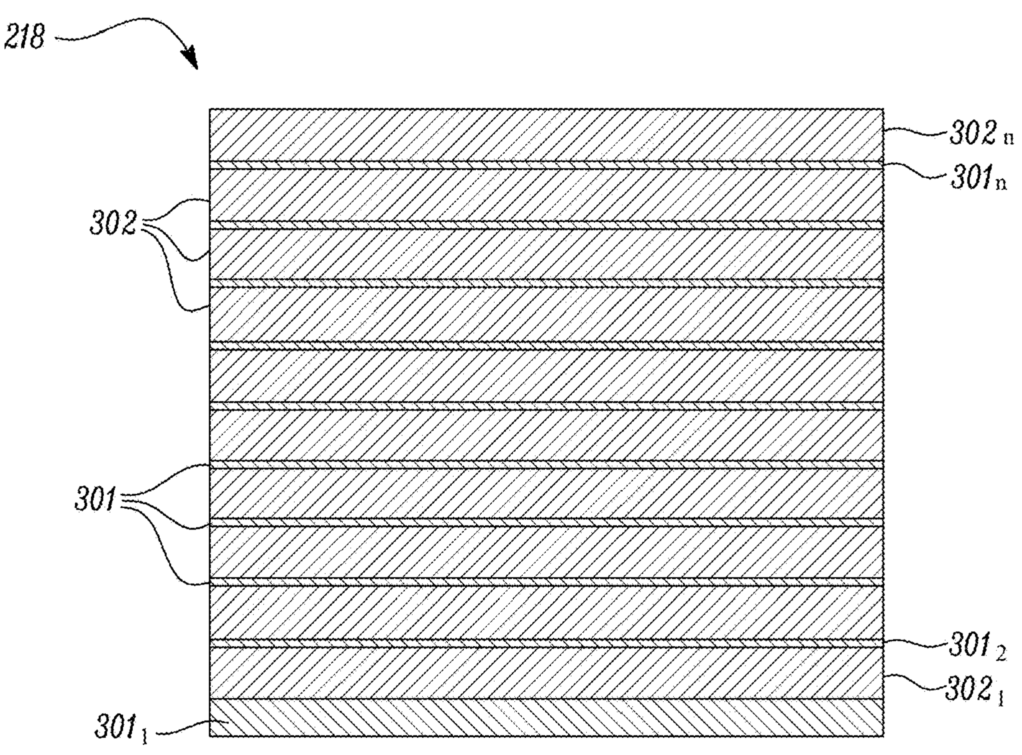
FIG. 3 is a detailed schematic sectional diagram of an example laminated composite material for the rotor sleeve of the electric machine of FIG. 2.

FIG. 3 illustrates schematically a section 220 through the rotor sleeve 218 of FIG. 2. The rotor sleeve 218 is composed of a laminated composite material having a first plurality of layers 301 of a first composite material interleaved with a second plurality of layers 302 of a second composite material. The first composite material in this example is a GFRP (glass fibre reinforced polymer). The second material in this example is a CFRP (carbon fibre reinforced polymer).

A first inner layer $\mathbf{301}_1$ of the first material may be thicker than the remaining layers $\mathbf{301}_{2\text{-}n}$. The first inner layer $\mathbf{301}_1$ may comprise fibres aligned at around +/−45° to the longitudinal axis of the stator sleeve, i.e. bias oriented. The remaining layers $301_{2-n}$ of the first material may comprise fibres aligned at +/−60° to the longitudinal axis of the rotor sleeve. In an example implementation, the first material may be formed from an AGY S-2 glass fibre prepreg. In a general aspect, the first composite material comprises fibres aligned at between around 30° and 60° to the longitudinal axis of the rotor sleeve 218.

Each of the layers $302_{1-n}$ of the second material may comprise fibres aligned at around 90° (e.g. around +/−89.6°) to the longitudinal axis, i.e. largely hoop oriented. In an example implementation, the second material may be formed from a Toray T1100G-12k carbon fibre prepreg.

An advantage of interleaving the first hoop-oriented material layers with the second bias-oriented material layers is that this arrangement tends to suppress early failure modes associated with resin matrix failure.

Further details of the manufacturing process for the laminated composite material are described in EP4050768A1, EP4050769A1 and EP4050770A1, which describe methods of manufacturing rotor sleeves that may be applied in this case.

Figure 4:
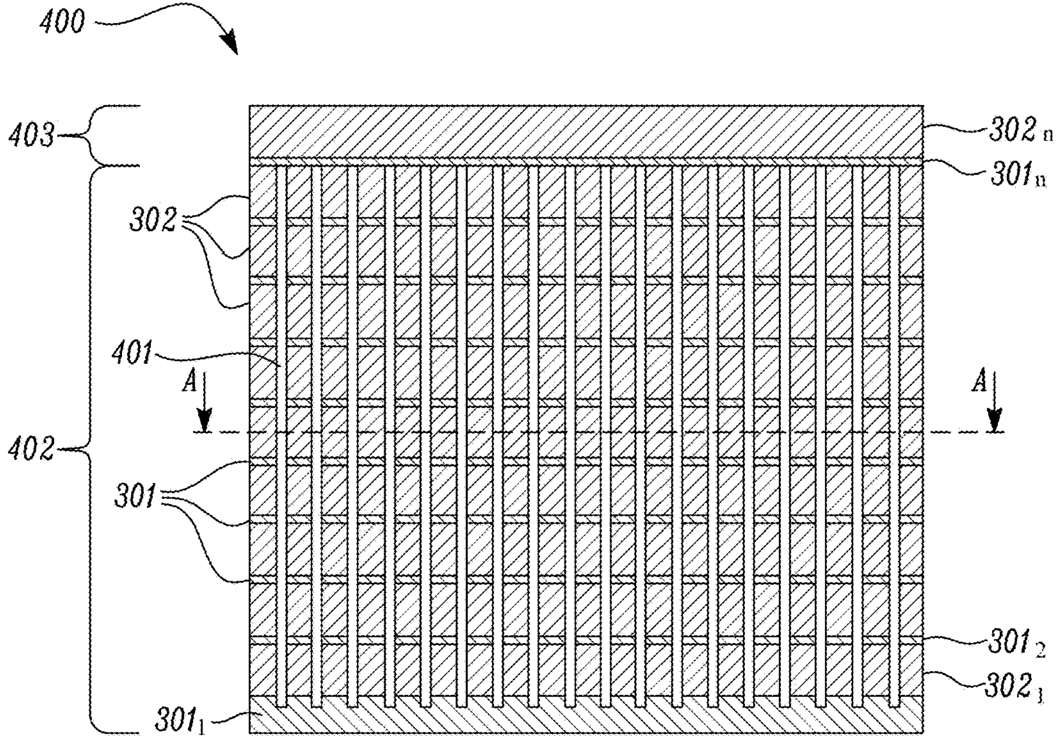
FIG. 4 is a detailed schematic sectional diagram of the example laminated composite material of FIG. 3 with ferromagnetic pins inserted through a thickness of the sleeve.
Figure 5:
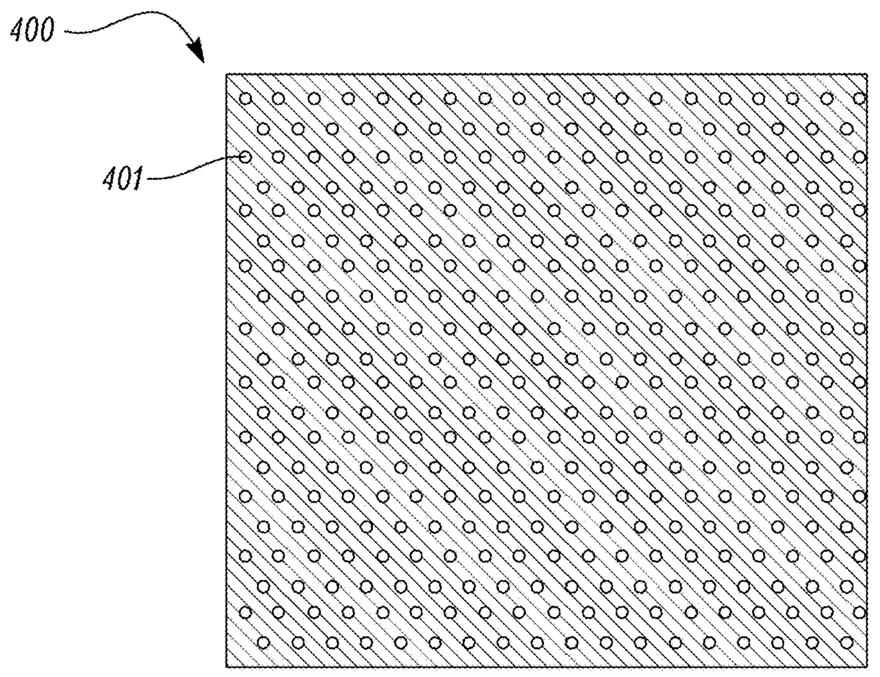
FIG. 5 is a schematic sectional diagram through a layer of the composite material of FIG. 4.

FIG. 4 illustrates schematically the laminated composite material of FIG. 3 with an array of ferromagnetic pins 401 extending through a thickness of the rotor sleeve 400. A section through one of the layers is illustrated in FIG. 5, showing the pins 401 arranged in a uniform array across the sleeve 400. In this example the array is a hexagonal array. Other forms of array, for example a square array, may be provided.

FIG. 4 illustrates the pins 401 extending through most of the thickness of the rotor sleeve 400 but not through the outermost layers $301_n$, $302_n$, which may be formed after insertion of the pins 401. The outermost layers $301_n$, $302_n$ thereby provide protection for the pins 401 and to ensure the pins 401 remain in place after the rotor sleeve 400 is completed. In a general aspect therefore, the rotor sleeve 400 comprises a first inner layer 402 and a second outer layer 403, the pins 401 extending through a thickness of the first inner layer 402.

Insertion of the pins may be performed according to a method described in U.S. Pat. No. 10,307,973, which details insertion of pins into composite materials to provide through thickness (z-direction) reinforcement for directionally strengthening and stiffening the laminate. The pins 401 in this instance, which may be composed of a material such as Fe, CoFe or a similar soft magnetic material, may be inserted in a similar way to that in U.S. Pat. No. 10,307,973, but instead of primarily being provided for reinforcement provide a soft magnetic material path through the rotor sleeve. This has the effect of reducing the effective air gap between the stator and rotor, improving efficiency of the electric machine. A further effect is that the pins 401 may also improve the through-thickness thermal conductivity of the rotor sleeve 400, which can enhance cooling of the electric machine.

The pin insertion process may be CNC controlled and may generate a range of pin patterns, orientations and pin lengths/insertion depths. Example implementations may use 0.25-0.5 mm diameter pins arranged in a regularly spaced array to achieve areal densities of between around 0.5-2%. Prior to insertion of each pin, a pilot hole may be formed using a rotating needle, following which the pin is inserted, cropped to length and tamped flush to the laminate surface. Using this process, a well-controlled array of soft magnetic pins may be provided within the rotor sleeve but with a limited and controlled impact on the physical, elastic and mechanical performance of the sleeve.

Winding of the laminate layers may be carried out by a well-established filament winding process, whereby a web of resin impregnated fibrous reinforcement (commonly known as a prepreg) is wound onto a rotating mandrel that defines the internal bore of the component. As the mandrel rotates, the band of composite material is wound under tension onto the mandrel to a pre-described and CNC programmed design. Alternative methods such as tape wrapping may be used, in which a wider web of composite material is wrapped and compacted on to a mandrel. It is understood that the composite reinforcement may be pre-impregnated with thermoplastic or thermosetting resins or 'wet-impregnated' by drawing fibre through a bath, die or rollers containing the matrix resin immediately before it is wound onto the mandrel tool.

As outlined above, the process may be interrupted before the final outer layers are wound for the pins to be inserted and tamped flush to the composite surface. Winding may then be completed to cover the pins to assure their retention during operation.

The spacing, pattern, angle, depth of insertion, pin material and diameter may be varied depending on the application and in some instances within a particular application. This can be a requirement for higher magnetic material loading at a certain axial or circumferential positions within the sleeve, requiring higher areal densities of pins. For electric machines with multiple sleeves, different sleeves may advantageously have different pinning densities or designs to control the electromagnetic field design more precisely within the machine.

The arrangement in FIGS. 4 and 5 illustrate a simple example with a uniform pin material, diameter, length, pitch/spacing and insertion depth. The pins 401 are covered by one or more outer laminate layers $301_n$, $302_n$ to retain the pins should they become de-bonded from the composite. More complex engineered arrangements may be preferred for specific applications or functions.

The thermal conductivity of the pin material may be selected to change the through-thickness thermal or electrical conductivity of the sleeve. In some examples, holes providing a fluid path through the sleeve may be provided, which may provide a fluid flow path from the rotor/stator air gap through the rotor sleeve if this is desired. Such holes may be formed using a similar process to pin insertion, but with the pin being extracted after insertion rather than cropped and tamped.

Figure 6:
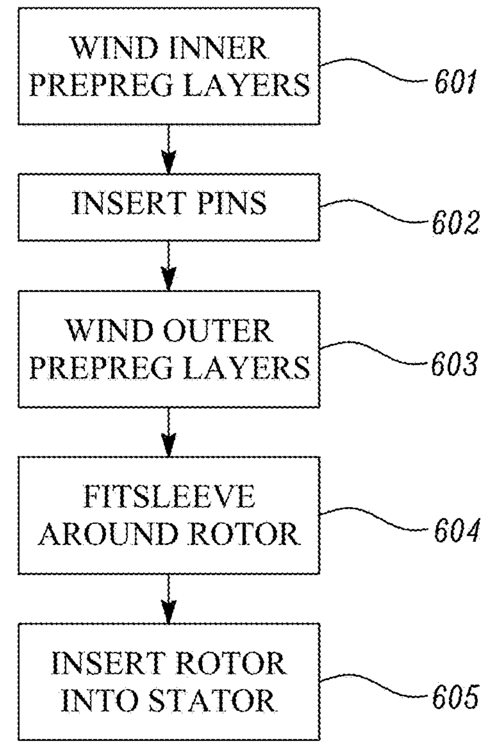
FIG. 6 is a schematic flow diagram illustrating a method of manufacturing an electric machine.

FIG. 6 is a flow diagram illustrating an example method of manufacturing an electric machine, including the steps described above of manufacturing a rotor sleeve, fitting the rotor sleeve around a rotor core, and assembling the electric machine by inserting the rotor assembly into a stator assembly. In a first step 601 a first inner layer is formed by winding inner prepreg layers of composite material. In a second step 602, a pins are inserted through a thickness of the first inner layer. In a third step 603, one or more outer layers of composite material are wound to form an outer layer over the pins. In a fourth step 604, after curing of the composite material, the sleeve is fitted around a plurality of magnets arranged around a rotor core. The rotor assembly may then, in a fifth step 605, be inserted into a stator assembly to form the electric machine.

Other embodiments are within the scope of the current disclosure, which is defined by the appended claims.

I claim:

1. A rotor assembly for an electric machine, the rotor assembly comprising:

a rotor core;

a plurality of magnets arranged around the rotor core; and a cylindrical rotor sleeve surrounding the plurality of magnets, wherein the rotor sleeve comprises a laminated composite material having an array of ferromagnetic pins extending through a thickness of the rotor sleeve.

2. The rotor assembly of claim 1, wherein the array of ferromagnetic pins extends around the rotor sleeve with a circumferential areal density of between around 0.5% and 2%.

3. The rotor assembly of claim 1, wherein the ferromagnetic pins are composed of a soft magnetic material.

4. The rotor assembly of claim 1, wherein the ferromagnetic pins have a diameter of between around 0.25 mm and around 0.5 mm.

5. The rotor assembly of claim 1, wherein the ferromagnetic pins are aligned radially through the thickness of the rotor sleeve.

6. The rotor assembly of claim 1, wherein the ferromagnetic pins are uniformly distributed around the rotor sleeve.

7. The rotor assembly of claim 1, wherein the rotor sleeve comprises a first inner layer and a second outer layer, the ferromagnetic pins extending through a thickness of the first inner layer.

8. The rotor assembly of claim 1, wherein the laminated composite material comprises a first plurality of layers of a first composite material interleaved with a second plurality of layers of a second composite material.

9. The rotor assembly of claim 8, wherein the first composite material is a GFRP and the second material is a CFRP.

10. The rotor assembly of claim 8, wherein the first composite material comprises fibres aligned at between around 30° and 60° to a longitudinal axis of the rotor sleeve.

11. The rotor assembly of claim 8, wherein the second composite material comprises fibres aligned at around 90° to a longitudinal axis of the rotor sleeve.

12. An electric machine comprising:

a stator assembly; and a rotor assembly according to claim 1 within the stator assembly.

13. A method of manufacturing a rotor sleeve for an electric machine, the method comprising:

winding a resin-impregnated fibrous material around a cylindrical mandrel to form a laminated composite material rotor sleeve; and inserting a plurality of ferromagnetic pins through a thickness of the rotor sleeve to provide an array of ferromagnetic pins around the rotor sleeve.

14. The method of claim 13, wherein the array of ferromagnetic pins extends around the rotor sleeve with the pins covering a circumferential areal density of between around 0.5% and 2%.

15. The method of claim 13, wherein the ferromagnetic pins are composed of a soft magnetic material.

16. The method of claim 13, wherein the ferromagnetic pins have a diameter of between around 0.25 mm and around 0.5 mm.

17. The method of claim 13, wherein the ferromagnetic pins are aligned radially through the thickness of the rotor sleeve.

18. The method of claim 13, wherein the ferromagnetic pins are uniformly distributed around the rotor sleeve.

19. The method of claim 13, comprising winding a further resin-impregnated fibrous material around the rotor sleeve following insertion of the plurality of ferromagnetic pins.

20. A method of manufacturing a rotor assembly for an electric machine, comprising:

manufacturing a rotor sleeve according to the method of claim 13; and fitting the rotor sleeve around a plurality of magnets arranged around a rotor core.

* * * * *